United States Patent [19]

Ross

[11] 4,011,100

[45] Mar. 8, 1977

[54] PIPE CLEANING METHOD AND APPARATUS

[76] Inventor: Louis Anthony Ralph Ross, 54 Llanvair Drive, South Ascot, Berkshire, England

[22] Filed: Jan. 13, 1975

[21] Appl. No.: 540,385

[30] Foreign Application Priority Data

Jan. 21, 1974 United Kingdom ............. 2824/74

[52] U.S. Cl. ........................... 134/8; 15/104.06 R; 15/104.12; 134/24
[51] Int. Cl.² ........................................ B08B 9/04
[58] Field of Search ........... 134/22 C, 24, 8, 166 C, 134/167 C, 168 C, 169 C; 15/104.12, 104.13, 104.14, 406, 104.06 R, 104.09

[56] References Cited

UNITED STATES PATENTS

| | | | |
|---|---|---|---|
| 1,510,212 | 9/1924 | Du Bois | 15/406 X |
| 2,326,525 | 8/1943 | Diwoky | 134/8 X |
| 2,597,263 | 5/1952 | Rodgers | 15/104.14 |
| 2,735,122 | 2/1956 | Pletcher | 15/104.3 R |
| 2,838,779 | 6/1958 | Craig et al. | 134/8 X |
| 3,446,666 | 5/1969 | Bodine | 134/22 C X |
| 3,587,194 | 6/1971 | Brown | 15/104.12 X |
| 3,600,736 | 8/1971 | Smith | 15/104.06 R |
| 3,708,819 | 1/1973 | Breston | 134/8 X |

Primary Examiner—S. Leon Bashore
Assistant Examiner—Marc L. Caroff
Attorney, Agent, or Firm—Cushman, Darby & Cushman

[57] ABSTRACT

A cleaning apparatus, having a motor, a rotatable scouring head, an inflatable collar, a frame fixed to the motor and collar, a swivel coupling on the frame, and a conduit for supplying fluid under pressure to the inflatable collar through the swivel coupling, is introduced into a pipe to be cleaned. The collar is inflated to fill the pipe cross-section. Fluid is then supplied under pressure into the pipe to propel the apparatus through the pipe and to actuate the motor thereby rotating the scouring head which scours the inner wall of the pipe.

10 Claims, 3 Drawing Figures

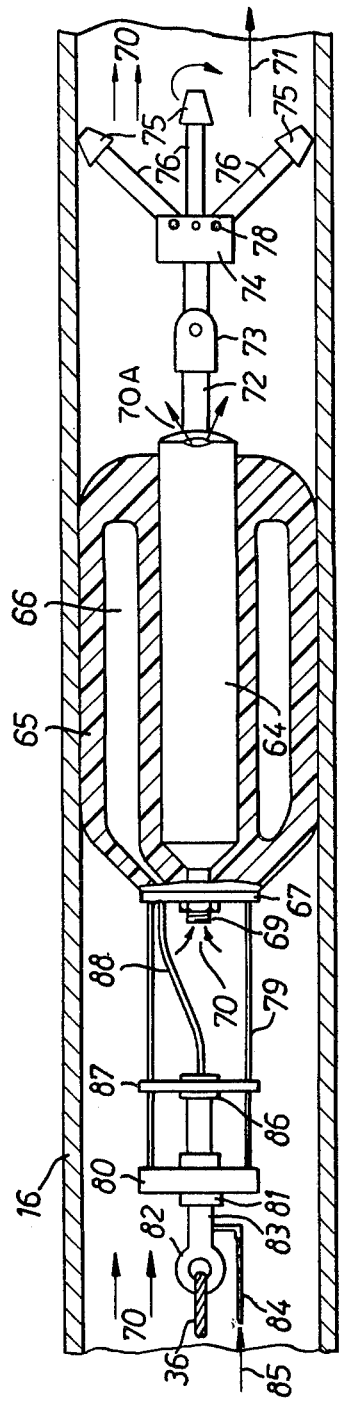
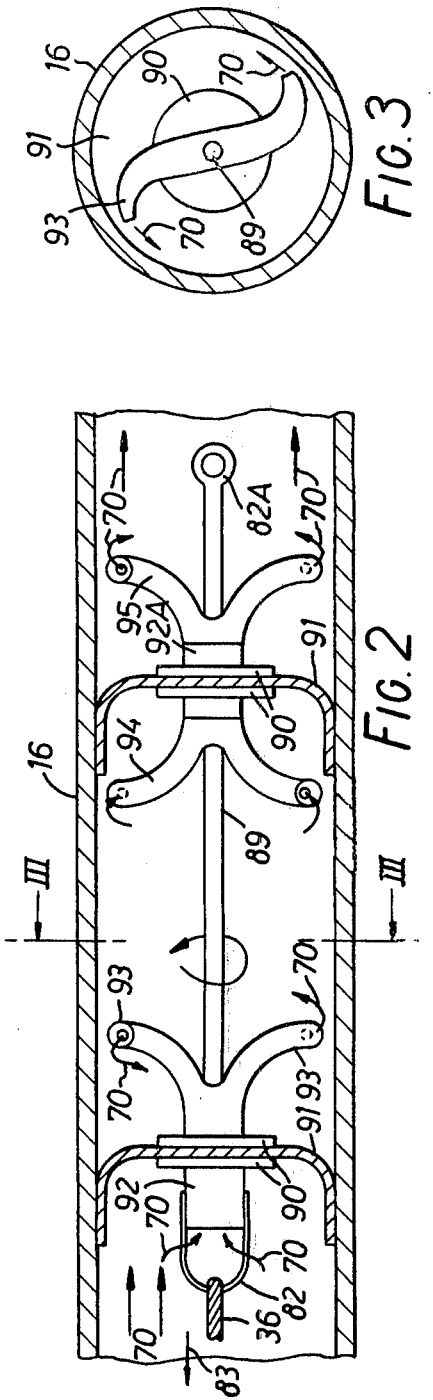

PIPE CLEANING METHOD AND APPARATUS

This invention is concerned with apparatus and methods for cleaning the inside surfaces of long cylindrical chambers, such as pipes, or mains for the transmission of fluids such as gas.

It is of advantage to be able to clean scale, rust and other debris from long lengths, for example 200 metres or more, of pipeline. There is no really effective way at present of doing this. Certain brushing and flailing apparatuses are known, but effective cleaning is only obtained by cleaning apparatus which is able to exert a cleaning action with substantial torque against the surface. Until now this has only been possible over relatively short lengths of chamber, e.g. boiler tubes, by employing an armoured hose extending out of the chamber as a reaction body for the cleaning apparatus.

Accordingly, the invention provides apparatus for cleaning the inside of long cylindrical chambers, comprising a rotatable scouring head driven by a motor, and an inflatable collar surrounding the motor.

Such an apparatus provides means whereby the reaction forces of the scouring head can be passed directly to the wall of the chamber at the point where the cleaning is taking place. Inflation of the collar allows a frictional force to be exerted between the inside of the chamber and the outside of the motor.

Preferably the apparatus is driven through the chamber by air pressure acting behind the motor and its inflated collar. Then the same air can be used as driving fluid for an air motor, and the air can also be ejected close to the scouring head so as to blow debris ahead of the apparatus in the chamber. But it is basically possible to two the apparatus through the main, and the motor need not be an air motor.

The invention also provides a method of cleaning the inside of a long cylindrical chamber comprising the steps of: introducing into one end of the chamber a cleaning apparatus having a motor, a rotatable scouring head drivable thereby, and an inflatable collar surrounding the motor; inflating said collar so as to substantially fill the cross-section of the chamber; and propelling the apparatus through the chamber with the motor rotating, so that the scouring head scours the inner wall of the chamber, the reaction force to the rotation of the scouring head being provided by friction between the collar and said wall.

Additionally, the invention provides apparatus for cleaning the inside of long cylindrical chambers comprising a body having a washer or collar, the diameter of which can adjust to fill the cross-section of the chamber it is to be used in, and ducts for air extending through the body so that an air supply from one side of the body can produce a turbulent dust removing air flow on the other side of the body.

In order that the invention shall be clearly understood, an exemplary embodiment thereof will now be described with reference to the accompanying drawings, in which:

FIG. 1 is a part sectional view of a first apparatus according to the invention;

FIG. 2 is a part sectional view of a second apparatus according to the invention, and FIG. 3 is a view on the line III—III in FIG. 2.

FIG. 1 shows a mains cleaning unit in longitudinal view in a main 16. An axially located air motor 64 is fixed to and centralised in the inner bore of an inflatable jacket 65 (which is shown in section). The jacket may be of rubber, polyurethane or like material. The jacket is inflated or part-deflated to suit the bore or condition of the section of main in which it is used by air under pressure admitted from a controlled source external to the main via a hose 84. Air under pressure travels in the direction indicated by the arrow 85 through a hollow shaft 83, formed integral with a ring 82, a swivel coupling 86 and a short length of flexible hose 88, into the annular space 66 within the inflatable jacket 65.

Variation in air pressure admitted to or from the annular space 66 will determine the degree of inflation and hence both the external and internal diameter of the inflatable jacket 65. Thus the jacket can be matched to the external diameter of the motor and the internal diameter of the main.

In an inflated condition, the jacket 65 may be propelled in the direction 71 through the main by air pressure applied between the rear of the jacket and a closure cap on the end of the main. The direction of air flow is indicated by arrows 70. Its forward axial progress is restricted by a steel rope 36 which controls the rate of progress and is attached to a frame 79 by the ring 82. Both the steel rope 36 and the air hose 84 pass through glands in the closure cap at the end of the main.

The end of the shaft 83 is fixed to a thrust bearing 81 which is secured to a flange 80 forming part of the frame 79. The latter is fixed to the rear of the air motor 64 by a flange 67 screwed on to an air connection 69 at the rear of the air motor.

The ring 82 and the shaft 83 are held axially by the flange 80 whilst being able to rotate relative to it by the facility afforded by the thrust bearing 81. A bearing 86 in a flange 87 serves as termination of the shaft 83, relative to which the latter can also rotate. In this way both the restrictive force on the cleaning unit exerted by the steel rope, and the air supply to the inflatable jacket, may continue to be applied irrespective of the relative orientation of the ring 82 and the frame 79.

Air passes through the air connection 69 to the air motor 64 and forms the drive of the motor, which rotates the shaft 72 and the boss 74 on which are pivotally mounted three arms 76 each terminating in cutting cones 75. This rotation, as indicated by arrow 79, acts centrifugally on the cones, imparting an outwards radial force upon them. The arms 76, to which the cones are attached and about which they are free to rotate, move radially outwards around their securing pins 78 in the boss 74. The arms 76 thus acts as flails and the cones 75 impinge upon and remove debris or incrustation from the walls of the main 16 as the motor rotates. The cones 75 are of a suitably hard material, roughened and/or with inset teeth to assist the action.

Exhausted air, indicated by arrows 70a, leaves the forward ports of the air motor and travels to the open end of the main. This blows a proportion of the debris forward ahead of the unit and out of the main.

Since the arms are exerting a cutting or flailing action against the surface of the main, the air motor must be applying a torque to the shaft 72, and the reaction to this is provided by the friction between the outside of the jacket 65 and the inside of the main.

Thus, the jacket around the motor is seen to provide two separate functions. First, it acts as a swab, filling up the full cross-section of the main so that the unit can be propelled by air pressure behind it. Second, it provides sufficient grip against the wall of the main for the motor to be effective in providing power to the shaft 72.

These functions are in theory mutually exclusive, since the jacket must be free to move in the main, and thus cannot provide a fully effective reaction stop for the motor. Nevertheless, it is not difficult to achieve the necessary compromise. Then, rotation of the motor as a whole is not entirely restrained, but its rate of bodily rotation is reduced to a tiny fraction of its rotor speed. Even then, the thrust bearings and swivel couplings prevent any twist being applied to the supply hose and rope.

Under normal operating conditions the steel rope restraining the unit will be taut. When the unit passes into a section of main having a slightly smaller diameter the unit will halt its axial progress and, unless a greater air pressure is applied behind it, or its diameter is reduced, no further axial movement will take place.

Indication that axial movement has ceased will be that the rope 36 has slackened. By actuation of a venting valve on the hose 84, the escape of air from the hose and jacket is allowed and the size of the latter is reduced. The unit can then continue its axial movement.

Should a large decrease in gauge pressure on the connection feeding air into the main be observed, it will indicate that the inflatable jacket has been deflated to a diameter much less than that of the main and that air is by-passing rapidly, through the space between the jacket and the pipe. This may be remedied by actuation of an air inflation valve on the air hose feeding air to the inflatable jacket until the normal gauge pressure of the main air supply to the air motor is restored.

Thus by trial an operator may maintain the correct pressure intensity in, and hence the correct size of the inflatable jacket during its progress through a main.

If required, depending on the nature of the debris to be cleared, wire brushes or spring loaded plates having hardened metal abrasive faces may be driven by the air motor in lieu of the flailing arms described.

In place of an air driven motor, the jacket may be used around an electric motor, and air under pressure employed just for axial propulsion of the unit. This arrangement requires the provision of an electrical supply cable, though. Forwardly exhausting air vents may be incorporated in the jacket to help the dispersal of matter removed by the cutting head.

In mains having considerable wall deposits of such thickness that it is impracticable initially to use the device previously described, the deposits may then be removed by initial pulling through of a scraper of known design.

The dust removal unit shown in longitudinal view in main 16 in FIG. 2 comprises a central solid shaft 89 to each end of which, by means of flanges 90, rubber discs or washers 91 are attached. The rubber discs 91 are shown flexed backwards to the direction of movement (indicated by arrow 71) of the unit through a main, and act as seals to the air flow indicated by arrows 70 due to pressure in the main between the end closure cap and the unit. The shaft 89 may carry a brush for sweeping the wall of the main.

Such air pressure applied to the unit will propel it through a main. The rate of axial progress is restricted by rope 36 extending in direction 83 and attached to ring 82. Means (not shown) — such as a capstan — external to the main control the rope, which enters the main via a gland in the closure cap.

Compressed air in excess of that which is required to propel the unit flows through a short tube 92 in the rearward flanges and emerges tangentially against the walls of the main 16 from tangentially directed openings at the ends of bends 93 affixed to the tube 92. The latter has a diameter about one sixth that of the main.

The direction and velocity of the air is such that dust particles are removed from the wall of the main and conveyed in a vortex in the cylindrical chamber between the two washers 91 into openings at the ends of bends 94 affixed to a rearward facing tube 91a set in the forward flanges.

The dust-laden air is conveyed through the tube 92a and out of the mouths of bends 95 affixed to the front of the short tube 92a.

By being ejected ahead of the unit, air from the 'vortex' chamber will disperse dust which may have previously settled in the main from the air stream carrying it, and drive it ahead of the unit.

A cross-sectional view of the unit shown in FIG. 2 at arrows III is shown in FIG. 3. It will be observed that the air outlets at the ends of the bends are of smaller diameter than the tube 92. By correct proportioning of the relative diameters of the tubes 92, 92a the outlets of the bends 93, 95, the velocity of the air emerging from the latter, may be made considerably greater than the velocity of the air passing through the tubes. Thus, for example, if two jets each of half-inch diameter provided in the bends are fed with air from a one inch diameter central tube the velocity of the air emerging from the jets will be double that which passes through the central tube.

Propelled by air pressure at a steady constrained speed through a main, the unit employs surplus air both to remove fine dust particles from the walls of a main and to carry such particles in a progressive process ahead of the unit through and out of a main.

For long mains, rope restraint of the unit may not be possible. It is possible to incorporate an air flow regulating valve in the air inlet pipe on the rear washer of the dust dispersal unit. The valve would be controlled by a battery powered solenoid.

The, if the unit is stopped by, for instance, excessive frictional resistance to its rubber washers or seals due to diminution in pipe diameter or change in character of the pipe wall surface, a switch operated by a wheel held in contact with the wall of the pipe would activate the solenoid to close the valve on the air inlet pipe in the rear washer.

With the valve closed, the air still being fed into the main between its closure cap and the dust dispersal unit will increase in pressure and the increasing force exerted on the rear washer of the unit will cause it to move axially through the main. Movement of the unit will operate the wheel and the switch will release the solenoid and allow the air control valve to open. Thus air is admitted into the vortex chamber of the unit, which will function again as required.

Alternatively, or in addition, a pressure switch may be set to work at pre-determined maximum and minimum air pressures to control the air flow regulating valve orifice between its fully closed or fully open positions.

Thus if the unit at any time starts to accelerate through the main, a drop in pressure of the air behind the unit will occur due to the excessive rate of increase in the cylindrical air storage capacity of the main behind the unit.

A dust collecting pouch fixed over the open end of the main may be used and the weight or volume of dust removed from the main by a single pass may be determined. Several passes of the unit may be required to remove dust from a main, each pass yielding a lesser volume of dust than previously obtained.

What I claim is:

1. A method of cleaning the inside of a long cylindrical chamber comprising the steps of: introducing into one end of the chamber a cleaning apparatus having a motor, a rotatable scouring head drivable thereby, and an inflatable collar surrounding the motor; a frame rigidly fixed to said motor and said collar, a swivel coupling on said frame, said swivel coupling having a pressure fluid supply connection thereon, and a conduit carried by said frame for supplying fluid under pressure to said inflatable collar through said swivel coupling inflating said collar through said conduit so as to substantially fill the cross-section of the chamber; supplying fluid under pressure into the cylindrical chamber to propel the apparatus through the chamber and to actuate the motor to rotate the scouring head to thereby scour the inner wall of the chamber, the reaction force to the rotation of the scouring head being provided by friction between the collar and said wall.

2. A method according to claim 1, wherein the motor is drivable by air under pressure and is driven by the air which acts to propel the apparatus.

3. A method according to claim 1, wherein air is allowed to escape forwardly of the apparatus and is so directed that it blows debris, scoured from the wall of the chamber, ahead of the apparatus.

4. A method according to claim 1 wherein forward movement of said apparatus is restrained by a rope or cable extending rearwardly thereof and out of the chamber.

5. Apparatus for cleaning the inside of a long cylindrical chamber comprising: a motor, a scouring head connected to said motor to be rotated thereby, an inflatable collar surrounding and securely attached to said motor, a frame rigidly fixed to said motor and said collar, a swivel coupling on said frame, said swivel coupling having a pressure fluid supply connection thereon, conduit means carried by said frame for supplying fluid under pressure to said inflatable collar through said swivel coupling.

6. Apparatus as claimed in claim 5, wherein the motor is an air motor drivable by air under pressure.

7. Apparatus as claimed in claim 6, wherein the motor has an exhaust vent for releasing air which has passed through the motor, which vent opens at that end of the motor nearest to the scouring head.

8. Apparatus as claimed in claim 5, wherein the scouring head comprises a central boss rotatable by the motor to which are hinged a plurality of arms, the free ends of the arms having scouring means thereon, and the arms being capable of swinging outwardly under centrifugal force when rotated.

9. Apparatus as claimed in claim 8, wherein the arms are hinged for pivotting in a plane which includes an axially directed and a radially directed position.

10. Apparatus as claimed in claim 5, wherein said scouring head comprises a hardened generally cone-shaped knob with an irregular surface.

* * * * *